(12) United States Patent
Matsumoto et al.

(10) Patent No.: US 9,460,498 B2
(45) Date of Patent: *Oct. 4, 2016

(54) IMAGE PROCESSING METHOD AND IMAGE PROCESSING DEVICE

(71) Applicant: Panasonic Intellectual Property Management Co., Ltd., Osaka (JP)

(72) Inventors: Kentaro Matsumoto, Osaka (JP); Haruo Yamashita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,938

(22) Filed: Feb. 23, 2015

(65) Prior Publication Data

US 2015/0243053 A1    Aug. 27, 2015

(30) Foreign Application Priority Data

Feb. 26, 2014  (JP) ................................. 2014-035000
Jan. 26, 2015  (JP) ................................. 2015-012814

(51) Int. Cl.
    *G06T 5/00*     (2006.01)

(52) U.S. Cl.
    CPC ..................... *G06T 5/008* (2013.01)

(58) Field of Classification Search
    CPC ..................... G06T 5/40; G06T 5/008; G06T 2207/20021; G06T 3/40; G06T 11/001; G06T 11/203; G06T 2207/10024; G06T 3/0056; H04N 19/00; H04N 5/2176
    See application file for complete search history.

(56) References Cited

U.S. PATENT DOCUMENTS

| 6,720,560 | B1* | 4/2004 | Edgar | H04N 1/00002 250/339.11 |
| 7,773,158 | B2  | 8/2010 | Yamashita et al. | |
| 7,880,814 | B2  | 2/2011 | Yamashita et al. | |
| 8,368,814 | B2  | 2/2013 | Yamashita et al. | |
| 2004/0175054 | A1* | 9/2004 | Ogata | G06T 5/009 382/274 |
| 2007/0080975 | A1 | 4/2007 | Yamashita et al. | |
| 2008/0240598 | A1* | 10/2008 | Hasegawa | G06T 5/40 382/254 |
| 2008/0240605 | A1* | 10/2008 | Enjuji | G06T 5/009 382/274 |
| 2010/0053384 | A1* | 3/2010 | Manabe | G06T 5/009 348/254 |
| 2010/0067819 | A1* | 3/2010 | Wu | G06T 5/009 382/260 |
| 2010/0157115 | A1 | 6/2010 | Yamashita et al. | |
| 2011/0025890 | A1 | 2/2011 | Yamashita et al. | |
| 2011/0317935 | A1* | 12/2011 | Anan | G09C 5/00 382/274 |

(Continued)

FOREIGN PATENT DOCUMENTS

| JP | 2007-180851 A | 7/2007 |
| JP | 2007-312349 A | 11/2007 |

(Continued)

*Primary Examiner* — Jingge Wu

(74) *Attorney, Agent, or Firm* — McDermott Will & Emery LLP

(57) ABSTRACT

An image processing method includes: (a) generating coefficients for a reduced image, using a predetermined relation; and (b) expanding the coefficients for the reduced image to coefficients for an original image, and correcting pixel values of the original image, wherein in step (b), expansion processing of expanding coefficients from coefficients corresponding to a first image to coefficients corresponding to a second image is performed on the coefficients corresponding to the reduced image, and step (b) further includes limiting, to a limit range according to the predetermined relation, at least one of a coefficient corresponding to the second image in the expansion processing or a corrected pixel value of the original image.

8 Claims, 15 Drawing Sheets

(56) References Cited

U.S. PATENT DOCUMENTS

2015/0221071 A1* 8/2015 Matsumoto .......... H04N 5/2176
　　　　　　　　　　　　　　　　　382/167

FOREIGN PATENT DOCUMENTS

| JP | 2012-027547 A | 2/2012 |
|----|---------------|--------|
| JP | 2013-127804 A | 6/2013 |

* cited by examiner

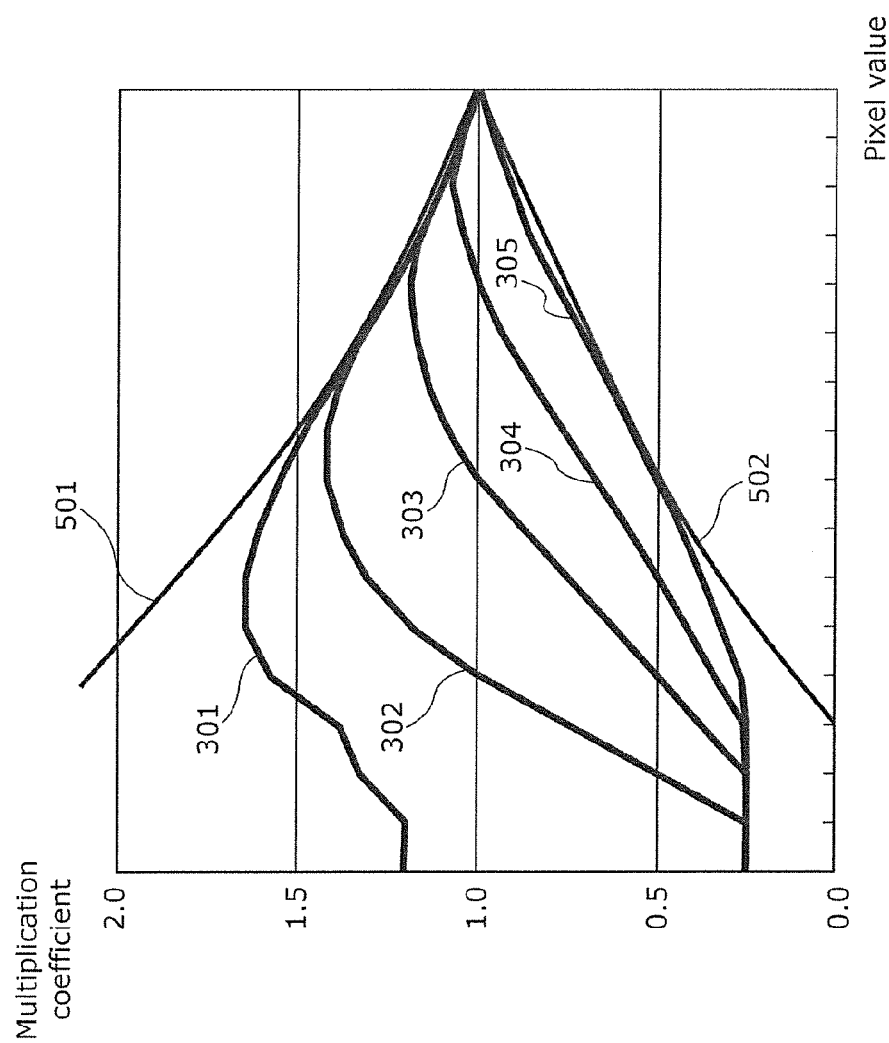

Numerical values in parentheses indicate pixel values

Numerical values in parentheses indicate pixel values

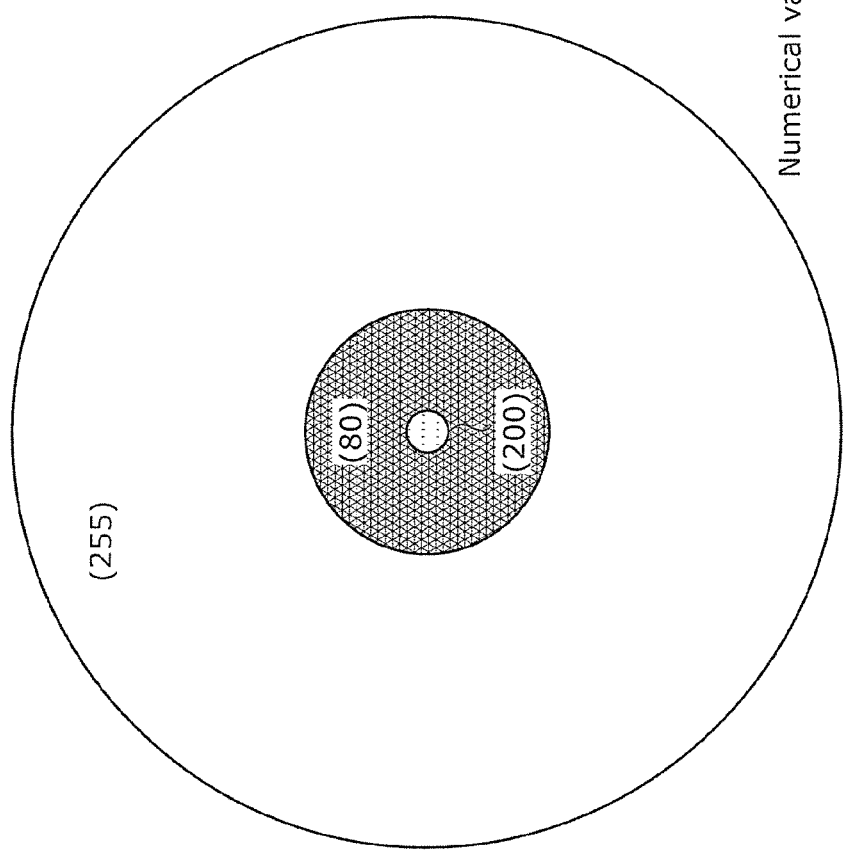

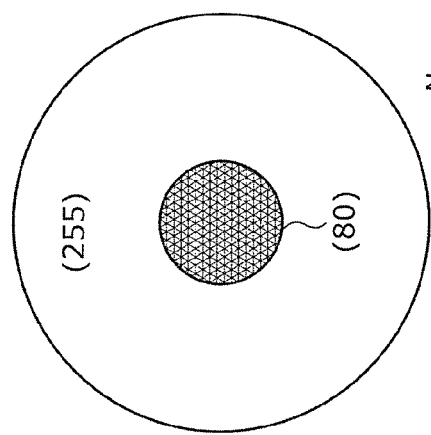

IMAGE PROCESSING METHOD AND IMAGE PROCESSING DEVICE

CROSS REFERENCE TO RELATED APPLICATIONS

The present application is based on and claims priority of Japanese Patent Application No. 2014-035000 filed on Feb. 26, 2014, and Japanese Patent Application No. 2015-12814 filed on Jan. 26, 2015. The entire disclosures of the above-identified applications, including the specifications, drawings and claims are incorporated herein by reference in their entirety.

FIELD

The present disclosure relates to an image processing method for correcting the brightness of an original image on a pixel-by-pixel basis.

BACKGROUND

Patent Literature (PTL) 1 discloses a vision processing device. According to this vision processing device, a vision processing unit outputs a first gain signal having a certain gain characteristic with respect to an image signal, and the image signal input to the vision processing device is corrected based on the first gain signal. Accordingly, correction processing can be performed with high accuracy, using a simple configuration.

CITATION LIST

Patent Literature

[PTL 1] Japanese Unexamined Patent Application Publication No. 2007-312349

SUMMARY

Technical Problem

The present disclosure provides an image processing method for achieving both reduction in the amount of processing of generating coefficients for correcting an original image and inhibition of deterioration in image quality caused by the reduction in the amount of processing.

Solution to Problem

An image processing method according to the present disclosure is an image processing method for correcting, on a pixel-by-pixel basis, brightness of an original image which includes pixels having pixel values each related to brightness, the image processing method including: (a) generating coefficients corresponding to pixels of a reduced image of the original image, using a predetermined relation for a pixel value of a current pixel to be processed, a brightness state related to brightness of a portion surrounding the current pixel, and a coefficient for correcting the pixel value of the current pixel; and (b) generating coefficients corresponding to the pixels of the original image from the coefficients corresponding to the pixels of the reduced image, to expand the coefficients corresponding to the pixels of the reduced image to the coefficients corresponding to the pixels of the original image, and correcting the pixel values of the pixels of the original image using the coefficients corresponding to the pixels of the original image, wherein in step (b), the coefficients corresponding to the pixels of the reduced image are expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and step (b) further includes limiting, to a limit range according to the predetermined relation, at least one of (i) a coefficient corresponding to a pixel of the pixels of the second image in at least one of the one or more times the expansion processing is performed or (ii) a corrected pixel value of the corrected pixel values of the pixels of the original image.

Advantageous Effects

An image processing method according to the present disclosure can achieve both reduction in the amount of processing of generating coefficients for correcting an original image and inhibition of deterioration in image quality caused by the reduction in the amount of processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates an example of a limit range according to Embodiment 1.

FIG. 8A illustrates examples of pixel values of an original image according to Embodiment 1.

FIG. 8B illustrates examples of pixel values of a reduced image according to Embodiment 1.

DESCRIPTION OF EMBODIMENTS

The following describes non-limiting embodiments in detail, with reference to the drawings as appropriate. However, unnecessarily detailed description may be omitted. For example, a detailed description of a matter already known well and redundant description of substantially the same configuration may be omitted. This is intended to prevent the following description from being unnecessarily redundant and facilitate understanding of a person skilled in the art.

It should be noted that the inventors provide the accompanying drawings and the following description, in order that a person skilled in the art sufficiently understands the present disclosure, and thus do not intend to limit a subject matter in the claims with the drawings and description.

Embodiment 1

The following describes a present non-limiting embodiment with reference to FIGS. 1 to 9.

[1-1. Configuration]

Figure 1:
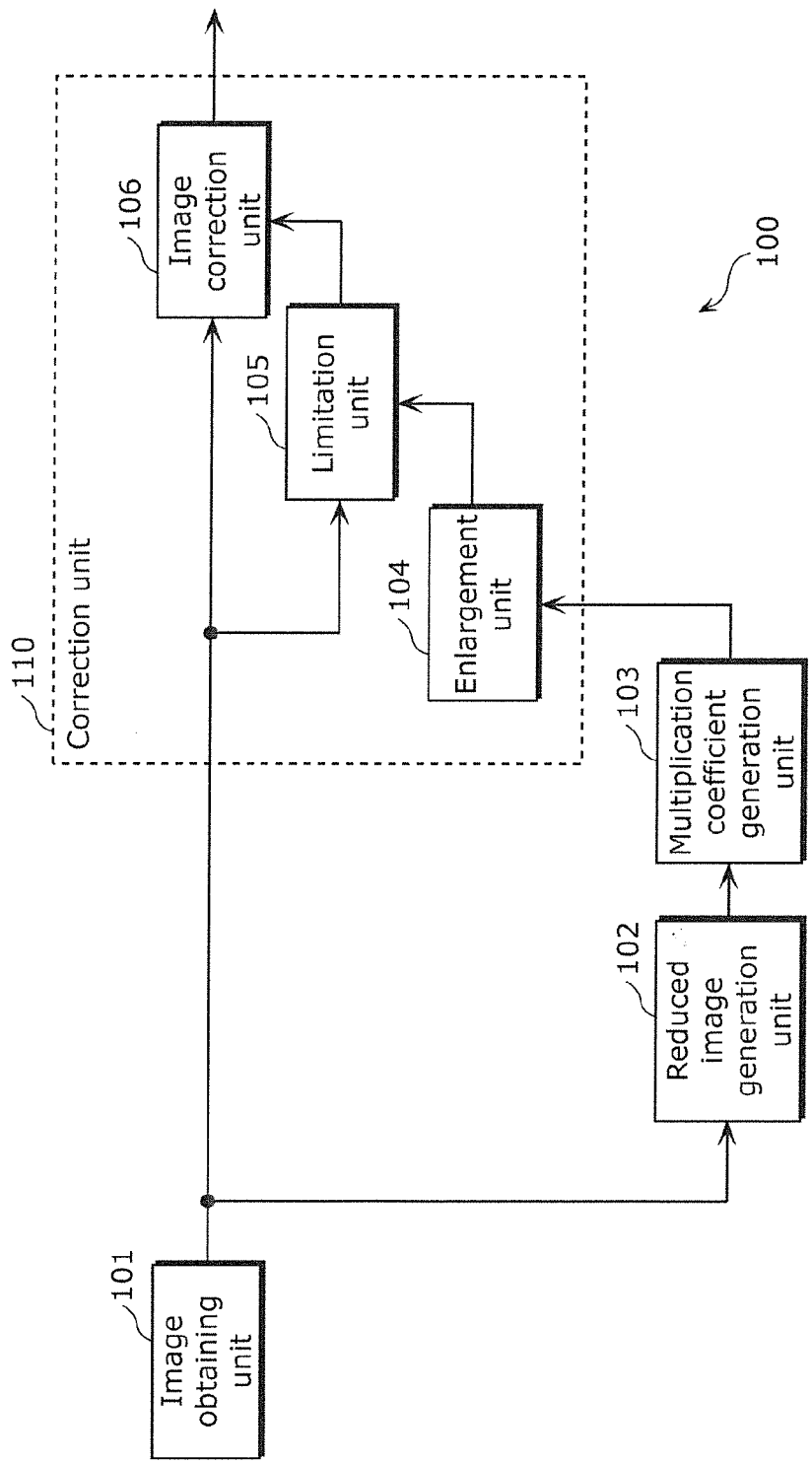
FIG. 1 is a configuration diagram illustrating a specific example of an image processing device according to Embodiment 1.

FIG. 1 is a configuration diagram illustrating a specific example of an image processing device according to the present embodiment. An image processing device 100 illustrated in FIG. 1 includes an image obtaining unit 101, a reduced image generation unit 102, a multiplication coefficient generation unit 103, an enlargement unit 104, a limitation unit 105, and an image correction unit 106. The enlargement unit 104, the limitation unit 105, and the image correction unit 106 form a correction unit 110.

The image obtaining unit 101 obtains an image as an original image. For example, the image obtaining unit 101 obtains an original image from a recording medium connected to the image processing device 100. This original image may be a picture included in a video stream or a still image. The following describes a picture included in a video stream as an original image which is to be processed, in order to facilitate a description.

Specifically, the image obtaining unit 101 obtains, as an original image, a picture at a certain time included in an input video stream. It should be noted that processing of decoding a video stream may be executed by the image processing device 100 or by an external device. In the latter case, the image obtaining unit 101 obtains a video stream on which decoding processing has been performed.

Here, an image includes a plurality of pixels. A pixel has a pixel value related to the brightness of the pixel. For example, the higher brightness a pixel has, the greater pixel value the pixel has, whereas the lower brightness a pixel has, the smaller pixel value the pixel has. Accordingly, a pixel value may be expressed as having high brightness if a pixel value is large, and a pixel value may be expressed as having low brightness if a pixel value is small. A pixel value may be a luminance value, a component of an RGB value, or a component of a YUV value.

The reduced image generation unit 102 reduces an image. For example, the reduced image generation unit 102 decreases the number of pixels of the original image obtained by the image obtaining unit 101, to generate a reduced image.

Specifically, the reduced image generation unit 102 performs low pass filter processing and subsampling processing, to generate a reduced image having no aliasing. For example, if the original image has 1920×1080 pixels, the reduced image generation unit 102 reduces this original image into an image having ¼ pixels both horizontally and vertically, to generate a reduced image having 480×270 pixels.

It should be noted that when generating a reduced image, the reduced image generation unit 102 may generate a reduced image having the same aspect ratio as that of an original image, or a reduced image having a different aspect ratio. In other words, a designer can freely set the number of pixels and the aspect ratio of a reduced image.

The reduced image generation unit 102 outputs the reduced image obtained by reducing the original image, to the multiplication coefficient generation unit 103.

Although the above describes filter processing as a method for generating a reduced image, the reduced image generation unit 102 calculates (computes) an average value of pixel values of an original image for each one of pixels of a reduced image, and generate the average value as a pixel value of that pixel of the reduced image.

The multiplication coefficient generation unit 103 is a generation unit which generates a multiplication coefficient. Specifically, the multiplication coefficient generation unit 103 calculates a multiplication coefficient for each of pixels of the reduced image, based on a pixel value of the pixel of the reduced image and a pixel value of a pixel located in a portion surrounding the pixel, to generate multiplication coefficients corresponding to the pixels of the reduced image. More specifically, the multiplication coefficient generation unit 103 generates multiplication coefficients based on characteristic information of a multiplication coefficient that varies depending on a brightness state (brightness level) related to brightness of a portion surrounding a current pixel to be processed.

For example, the characteristic information indicates a relation between a pixel value of a current pixel to be processed, a brightness state related to brightness of a portion surrounding the current pixel, and a multiplication coefficient for correcting the pixel value of the current pixel. Specifically, the brightness state indicates brightness of pixels which include a current pixel to be processed and one or more pixels in a portion surrounding the current pixel.

The multiplication coefficients generated by the multiplication coefficient generation unit 103 are coefficients for correcting, among pixels of the original image, pixel values of pixels corresponding to pixels of the reduced image. Such a multiplication coefficient may be considered to be a coefficient for correcting a pixel value of a pixel of the reduced image. In addition, the multiplication coefficient may be expressed as a gain. Furthermore, multiplication coefficients corresponding to pixels of an image may correspond to the image, and may be expressed as a gain map. Such multiplication coefficients may be expressed also as a coefficient map, a coefficient matrix, or coefficient data.

As described above, such a multiplication coefficient is generated for each pixel included in the reduced image. Then, multiplication coefficients that are the same in number as the pixels of the reduced image are expanded by the next processing, to generate multiplication coefficients that are the same in number as pixels of the original image.

Figure 2:
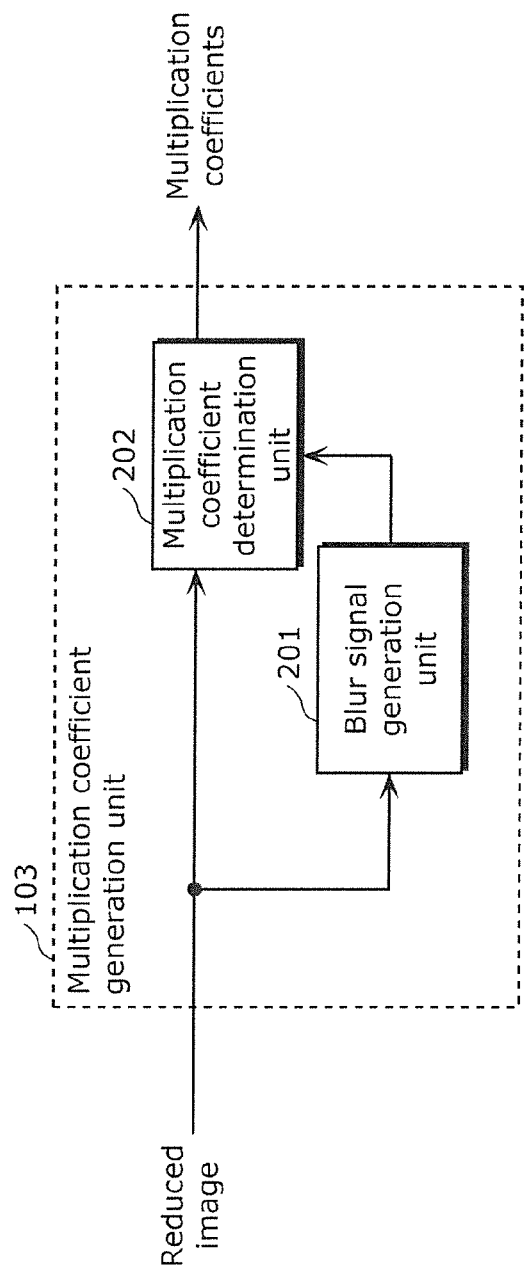
FIG. 2 is a configuration diagram illustrating a specific example of a multiplication coefficient generation unit according to Embodiment 1.

FIG. 2 is a configuration diagram illustrating a specific example of the multiplication coefficient generation unit 103 illustrated in FIG. 1, and is an explanatory diagram of a specific example of generating multiplication coefficients from a reduced image input to the multiplication coefficient generation unit 103. For example, the multiplication coefficient generation unit 103 includes a blur signal generation unit 201 and a multiplication coefficient determination unit 202, as illustrated in FIG. 2.

The blur signal generation unit 201, for each pixel of a reduced image, combines a pixel value of the pixel and pixel values of pixels located in a portion surrounding the pixel, to generate a blur signal. A blur signal includes information indicating the lightness of a current pixel to be processed and a portion surrounding the pixel (in other words, average brightness of the current pixel and the portion surrounding the pixel).

Here, a surrounding portion defines a range, the length of which corresponds to one pixel or a predetermined number of pixels, for example. Pixels located in a portion surrounding a current pixel to be processed may adjoin the current pixel. Here, although a pixel value of a current pixel to be processed is used to generate a blur signal, only pixel values of pixels located in a portion surrounding the current pixel may be used. Furthermore, a position of a pixel may correspond to the center of the pixel or the upper left corner of the pixel, for instance.

Specifically, the blur signal generation unit 201 performs filter processing on pixel values (for example, luminance values) of a current pixel to be processed and pixels located in a portion surrounding the current pixel, using a two-dimensional low pass filter or one-dimensional low pass filter, for instance. Then, the blur signal generation unit 201 outputs a blur signal obtained by filter processing, to the multiplication coefficient determination unit 202.

The multiplication coefficient determination unit 202, for each pixel of the reduced image, determines a multiplication coefficient based on a pixel value of the pixel and a blur signal corresponding to the pixel, to generate multiplication coefficients that are the same in number as pixels of the reduced image. For example, if the reduced image has 480×270 pixels, 480×270 multiplication coefficients are generated.

Specifically, the multiplication coefficient determination unit 202 generates a multiplication coefficient from a pixel value of the reduced image and a blur signal, using a two-dimensional look-up table (LUT). Here, a two-dimensional LUT is a table for determining a multiplication coefficient based on a pixel value of a reduced image and a blur signal. Accordingly, the two-dimensional LUT defines a multiplication coefficient corresponding to a pixel value of a reduced image and a blur signal.

For example, the two-dimensional LUT includes a plurality of tables each showing the correspondence between pixel values and multiplication coefficients. The multiplication coefficient determination unit 202 selects a table from among the plurality of tables, using the blur signal input from the blur signal generation unit 201. Then, the multiplication coefficient determination unit 202 determines a multiplication coefficient corresponding to a pixel value of the reduced image, with reference to the selected table, to generate a multiplication coefficient. It should be noted that a function for determining a multiplication coefficient based on a pixel value of a reduced image and a blur signal may be used for a two-dimensional LUT.

For example, the multiplication coefficient determination unit 202 generates a multiplication coefficient for correcting a dark portion. Correction of a dark portion is for brightening a dark area (dark portion), and corresponds to human visual characteristics. Such correction of a dark portion may be combined with correction of a bright portion for darkening a bright area (bright portion).

A person has visual characteristics which unconsciously convert information that comes into eyes. The two-dimensional LUT used by the multiplication coefficient determination unit 202 represents as characteristic information, in simple, conversion characteristics similar to visual characteristics called brightness contrast or color contrast, in particular. Specifically, even when brightness is physically the same, if a surrounding portion is bright, the same brightness is perceived to be rather dark, whereas if a surrounding portion is dark, the same brightness is perceived to be rather bright. Such visual characteristics are called brightness contrast.

The multiplication coefficient determination unit 202 generates multiplication coefficients corresponding to such visual characteristics, in order to improve subjective image quality. In particular, the multiplication coefficient determination unit 202 generates a multiplication coefficient using a blur signal on which one or more pixel values in a surrounding portion are reflected, in order to inhibit contrast from disappearing due to correction. Accordingly, an appropriate multiplication coefficient is generated, thus inhibiting disappearance of contrast.

Figure 3:
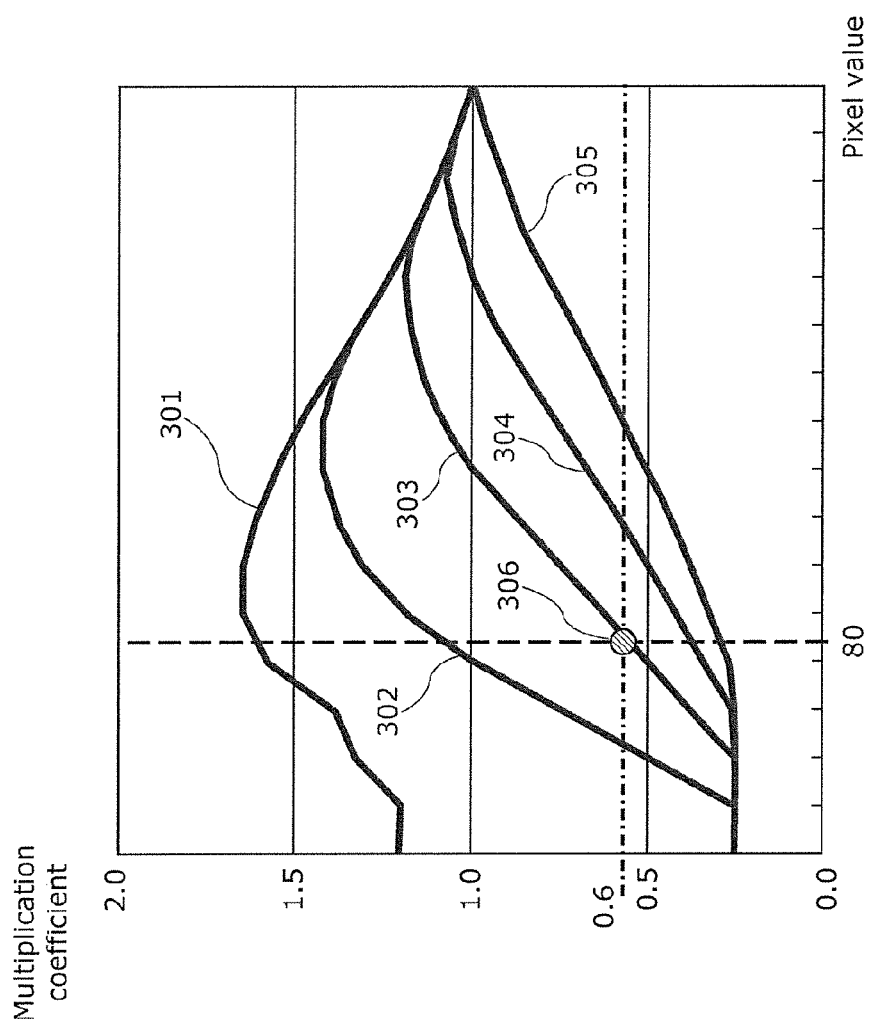
FIG. 3 illustrates a specific example of a two-dimensional look-up table (LUT) according to Embodiment 1.

FIG. 3 illustrates an example of a two-dimensional LUT used by the multiplication coefficient determination unit 202. In FIG. 3, a horizontal axis indicates a pixel value of a current pixel to be processed, and a vertical axis indicates a multiplication coefficient. The description below is given assuming that a permissible range of a pixel value of a current pixel to be processed and a value of a blur signal (blur signal value) is 0 to 255.

The multiplication coefficient determination unit 202 selects a one-dimensional characteristics table according to a blur signal value. Specifically, if a blur signal value is 0, the multiplication coefficient determination unit 202 selects a one-dimensional characteristics table 301.

Similarly, if a blur signal value is 64, the multiplication coefficient determination unit 202 selects a one-dimensional characteristics table 302. If a blur signal value is 128, the multiplication coefficient determination unit 202 selects a one-dimensional characteristics table 303. If a blur signal value is 196, the multiplication coefficient determination unit 202 selects a one-dimensional characteristics table 304. If a blur signal value is 255, the multiplication coefficient determination unit 202 selects a one-dimensional characteristics table 305.

Although FIG. 3 illustrates, for convenience, one-dimensional characteristics tables for blur signal values of 0, 64, 128, 196, and 255, a two-dimensional LUT has one-dimensional characteristics tables having shapes different for blur signal values. The multiplication coefficient determination unit 202 selects a one-dimensional characteristics table according to a blur signal value. Then, the multiplication coefficient determination unit 202 calculates, as a multiplication coefficient corresponding to a current pixel to be processed, a multiplication coefficient corresponding to a pixel value of the current pixel from the selected one-dimensional characteristics table.

For example, if a blur signal value is 128 and a pixel value is 80, the multiplication coefficient determination unit 202 calculates, as a multiplication coefficient corresponding to the current pixel, a multiplication coefficient of 0.6 at point 306 on the one-dimensional characteristics table 303 in FIG. 3.

It should be noted that ideally, the two-dimensional LUT shows multiplication coefficients for all combinations of gradations in blur signal value and gradations in pixel value of a reduced image. However, multiplication coefficients shown by the two-dimensional LUT may be discretized and expressed by polygonal lines, in order to achieve simplification. In that case, when the multiplication coefficient determination unit 202 is to refer to a multiplication coefficient between discretized multiplication coefficients, the multiplication coefficient determination unit 202 interpolates the multiplication coefficient between the discretized multiplication coefficients from the discretized multiplication coefficients, and refers to the interpolated multiplication coefficient.

The enlargement unit 104 generates, from the multiplication coefficients corresponding to pixels of the reduced image, multiplication coefficients corresponding to pixels of an original image, to enlarge the multiplication coefficients corresponding to the pixels of the reduced image to the multiplication coefficients corresponding to the pixels of the original image. Here, enlarging multiplication coefficients does not mean a change of multiplication coefficients to greater coefficients, but rather mean an increase in the number of multiplication coefficients. Therefore, "enlarge" may be expressed as "expand".

In other words, the enlargement unit 104 generates a gain map of the original image from a gain map of the reduced image, to enlarge the gain map of the reduced image to the gain map of the original image. Furthermore, to put it another way, the enlargement unit 104 develops multiplication coefficients corresponding to pixels of the reduced image into multiplication coefficients corresponding to pixels of the original image.

Specifically, for example, the enlargement unit 104 enlarges multiplication coefficients by enlargement processing in which bilinear interpolation (linear interpolation) is used. As another method, the enlargement unit 104 enlarges multiplication coefficients by enlargement processing in which nearest neighbor interpolation is used. Furthermore, as another method, the enlargement unit 104 enlarges multiplication coefficients by enlargement processing in which bicubic interpolation is used.

The limitation unit 105 limits multiplication coefficients generated for pixels included in the original image, in accordance with the upper limit, the lower limit, or both according to a pixel value of the pixel. A detailed description of the limitation unit 105 will be given below.

The image correction unit 106 corrects an original image. For example, the image correction unit 106 corrects a dark portion or a bright portion of the original image. Specifically, the image correction unit 106 multiplies one of multiplication coefficients generated for pixels included in the original image by a pixel value of a corresponding pixel, to correct the pixel value of the pixel.

For example, the image correction unit 106 generates a pixel value ($X_{out}$) obtained by multiplying a multiplication coefficient (g) by a pixel value ($X_{in}$) of the original image, as shown in Expression 1. The image correction unit 106 generates an image which includes the generated pixel value ($X_{out}$), to correct the original image.

$$X_{out} = gX_{in} \quad \text{(Expression 1)}$$

More specifically, the image correction unit 106 performs correction processing on a component of an RGB value as a pixel value of an original image. It should be noted that, as another method, the image correction unit 106 may perform correction processing on a component of a YUV value as a pixel value of an original image.

[1-2. Details of Limitation Unit 105]

The following describes specific operation of the limitation unit 105, with reference to the drawings.

The limitation unit 105 calculates a limit value for a multiplication coefficient according to a pixel value of a current pixel to be processed in an original image. Specifically, the limitation unit 105 calculates a limit value using a one-dimensional characteristics table obtained from a two-dimensional LUT used by the multiplication coefficient generation unit 103, according to a pixel value of a current pixel to be processed. Then, the limitation unit 105 limits a multiplication coefficient in accordance with the calculated limit value. In short, the limitation unit 105 limits the multiplication coefficient corresponding to the pixel of the original image to a range set according to the pixel value of the original image and characteristic information used by the multiplication coefficient generation unit 103.

Figure 4:
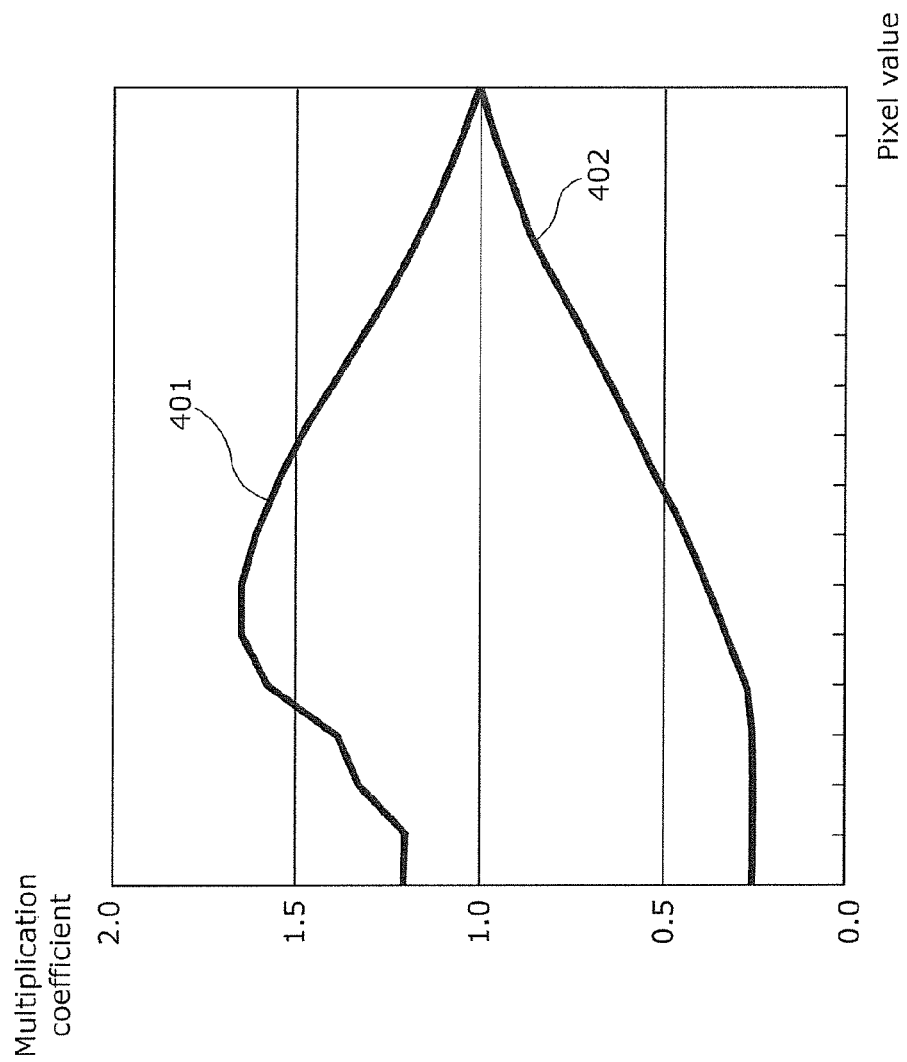
FIG. 4 illustrates an example of a limit range according to Embodiment 1.

FIG. 4 illustrates an example of a limit range according to the present embodiment. FIG. 4 illustrates an upper limit one-dimensional characteristics table 401 and a lower limit one-dimensional characteristics table 402.

The limitation unit 105 generates a one-dimensional characteristics table by projecting a two-dimensional LUT used by the multiplication coefficient generation unit 103 onto one-dimension. For example, the upper limit one-dimensional characteristics table 401 includes the greatest multiplication coefficients obtained from blur signal values of 0 to 255 for pixel values of 0 to 255, in the two-dimensional LUT illustrated in FIG. 3. Similarly, the lower limit one-dimensional characteristics table 402 includes the smallest multiplication coefficients for pixel values of 0 to 255.

In short, the limitation unit 105 sets, for each pixel value, an upper limit of a multiplication coefficient corresponding to the pixel value to the greatest one of multiplication coefficients calculated for the pixel value using characteristic information of the multiplication coefficients in correspondence with blur signal values. Furthermore, the limitation unit 105 sets, for each pixel value, a lower limit of a multiplication coefficient corresponding to the pixel value to the smallest one of multiplication coefficients calculated for the pixel value using characteristic information of the multiplication coefficients in correspondence with blur signal values.

If a multiplication coefficient obtained by the enlargement unit 104 is greater than the upper limit, or if a multiplication coefficient is smaller than the lower limit, the limitation unit 105 converts the multiplication coefficient into a multiplication coefficient in a range between the upper limit and the lower limit. For example, if a multiplication coefficient obtained by the enlargement unit 104 is greater than the upper limit, the limitation unit 105 replaces the multiplication coefficient obtained by the enlargement unit 104 with a multiplication coefficient at the upper limit. In contrast, if a multiplication coefficient obtained by the enlargement unit 104 is smaller than the lower limit, the limitation unit 105 replaces the multiplication coefficient obtained by the enlargement unit 104 with a multiplication coefficient at the lower limit.

It should be noted that the limiting operation is not limited to the above operation. If a multiplication coefficient obtained by the enlargement unit 104 is greater than the upper limit, the limitation unit 105 may convert the multiplication coefficient obtained by the enlargement unit 104 into a given multiplication coefficient in a range between the upper limit and the lower limit.

In the above configuration, the enlargement unit 104 enlarges multiplication coefficients generated by the multiplication coefficient generation unit 103 one time. However, the number of times enlargement is performed is not limited to one time. The enlargement unit 104 may enlarge multiplication coefficients multiple times. For example, the enlargement unit 104 may enlarge multiplication coefficients for a reduced image to multiplication coefficients for an intermediate image larger than the reduced image and smaller than an original image, and thereafter expand the multiplication coefficients for the intermediate image to multiplication coefficients for the original image.

In this case, the limitation unit 105 limits the multiplication coefficients which have been enlarged. The limitation unit 105 may limit multiplication coefficients obtained by any of the multiple times enlargement is performed. For example, if the enlargement unit 104 performs enlargement processing two times, the limitation unit 105 may limit multiplication coefficients obtained by the first enlargement or by the second enlargement.

[1-3. Variation 1 of Limitation Unit 105]

The following describes Variation 1 of the limitation unit 105. In this variation, both the upper limit one-dimensional characteristics table and the lower limit one-dimensional characteristics table are one-dimensional characteristics tables corresponding to predetermined blur signal values in the two-dimensional LUT.

For example, the upper limit one-dimensional characteristics table set by the limitation unit 105 may be a one-dimensional characteristics table corresponding to a blur signal value of 0 which indicates the lowest brightness in the two-dimensional LUT in FIG. 3. In addition, the lower limit one-dimensional characteristics table set by the limitation unit 105 may be a one-dimensional characteristics table corresponding to a blur signal value of 255 which indicates the highest brightness in the two-dimensional LUT in FIG. 3.

The limitation unit 105 calculates a limit value from the one-dimensional characteristics tables, according to a pixel value of a current pixel to be processed in the original image.

[1-4. Variation 2 of Limitation Unit 105]

The following describes Variation 2 of the limitation unit 105. In this variation, the limitation unit 105 limits multiplication coefficients in accordance with a function (approximation function) which approximates to a one-dimensional characteristics table.

For example, the limitation unit 105 calculates a quadratic function which approximates to the upper or lower limit one-dimensional characteristics table set in the present embodiment or Variation 1. When the limitation unit 105 calculates a quadratic function which approximates to a one-dimensional characteristics table, the limitation unit 105 may calculate coefficients of a quadratic function using the least square method.

At that time, if the shape of the one-dimensional characteristics table is greatly different from the shape of the quadratic function, the limitation unit 105 may calculate coefficients of the quadratic function using the least square method, only in a range where a pixel value is greater than a predetermined value. This is because the effect of limitation becomes more noticeable with an increase in pixel value, and sufficient effect can be obtained by using a range of large pixel values only.

FIG. 5 illustrates a limit range according to this variation. FIG. 5 illustrates an upper limit quadratic function 501 and a lower limit quadratic function 502. The upper limit quadratic function 501 and the lower limit quadratic function 502 are each obtained by calculating a function which approximates to a one-dimensional characteristics table.

[1-5. Supplementary Description]

As described above, the image processing device 100 according to the present embodiment obtains an original image, reduces the obtained original image, and generates a reduced image. Here, the reduced image is an image having lower resolution than the original image. In addition, the image processing device 100 calculates a multiplication coefficient for each pixel included in the reduced image, based on characteristic information of a multiplication coefficient by which a pixel value of a current pixel to be processed is to be multiplied. It should be noted that characteristic information defines a multiplication coefficient in accordance with a pixel value of a current pixel to be processed and a brightness state related to the brightness of a portion surrounding the current pixel.

The image processing device 100 enlarges, one or more times, multiplication coefficients calculated for pixels included in the reduced image, to calculate multiplication coefficients corresponding to pixels included in the original image. When the image processing device 100 enlarges multiplication coefficients calculated for pixels included in the reduced image, the image processing device 100 limits the multiplication coefficients obtained by at least one of the one or more times enlargement is performed. Then, the image processing device 100 multiplies pixel values of corresponding pixels among pixels included in the original image by the limited multiplication coefficients, to correct the original image.

In the above, if the image processing device 100 limits multiplication coefficients which have been enlarged, the image processing device 100 limits the enlarged multiplication coefficients to a range set by pixel values of pixels corresponding to the enlarged multiplication coefficients and characteristic information.

[1-6. Advantageous Effects and Others]

Multiplication coefficients corresponding to pixels of the reduced image are generated, and enlarged to multiplication coefficients corresponding to pixels of the original image. As a result, multiplication coefficients corresponding to pixels of the original image are generated efficiently.

However, in an area where a design has disappeared due to reduction, multiplication coefficients obtained by enlarging the multiplication coefficients calculated for the reduced image may be greatly different from multiplication coefficients obtained by two-dimensional LUT processing on the original image, without reducing the original image. This may excessively increase or decrease the brightness of a small bright area in a dark area more than intended.

This phenomenon is caused by the following: multiplication coefficients corresponding to pixels of the reduced image of the original image are calculated using the reduced image; and the multiplication coefficients corresponding to the pixels of the reduced image are enlarged to the multiplication coefficients corresponding to pixels of the original image. More specifically, this phenomenon is caused by the disappearance of a design due to reduction.

Figure 6A:
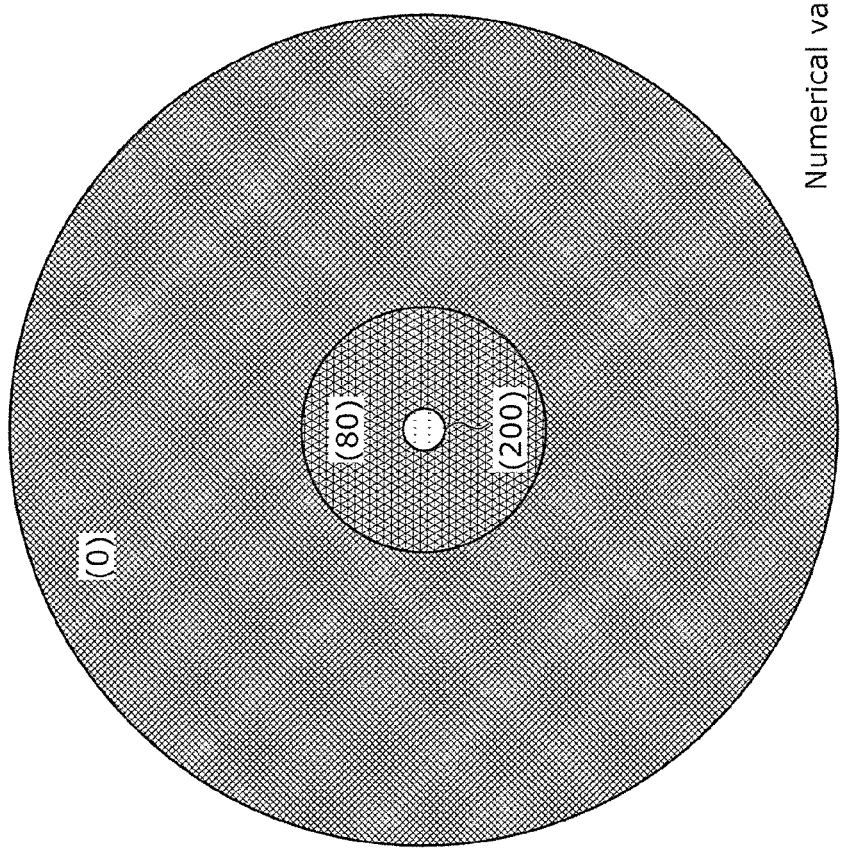
FIG. 6A illustrates examples of pixel values of an original image according to Embodiment 1.
Figure 6B:
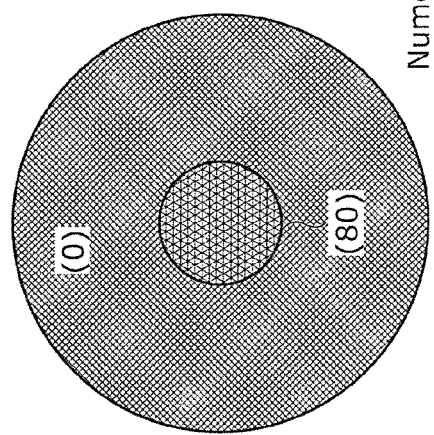
FIG. 6B illustrates examples of pixel values of a reduced image according to Embodiment 1.
Figure 7:
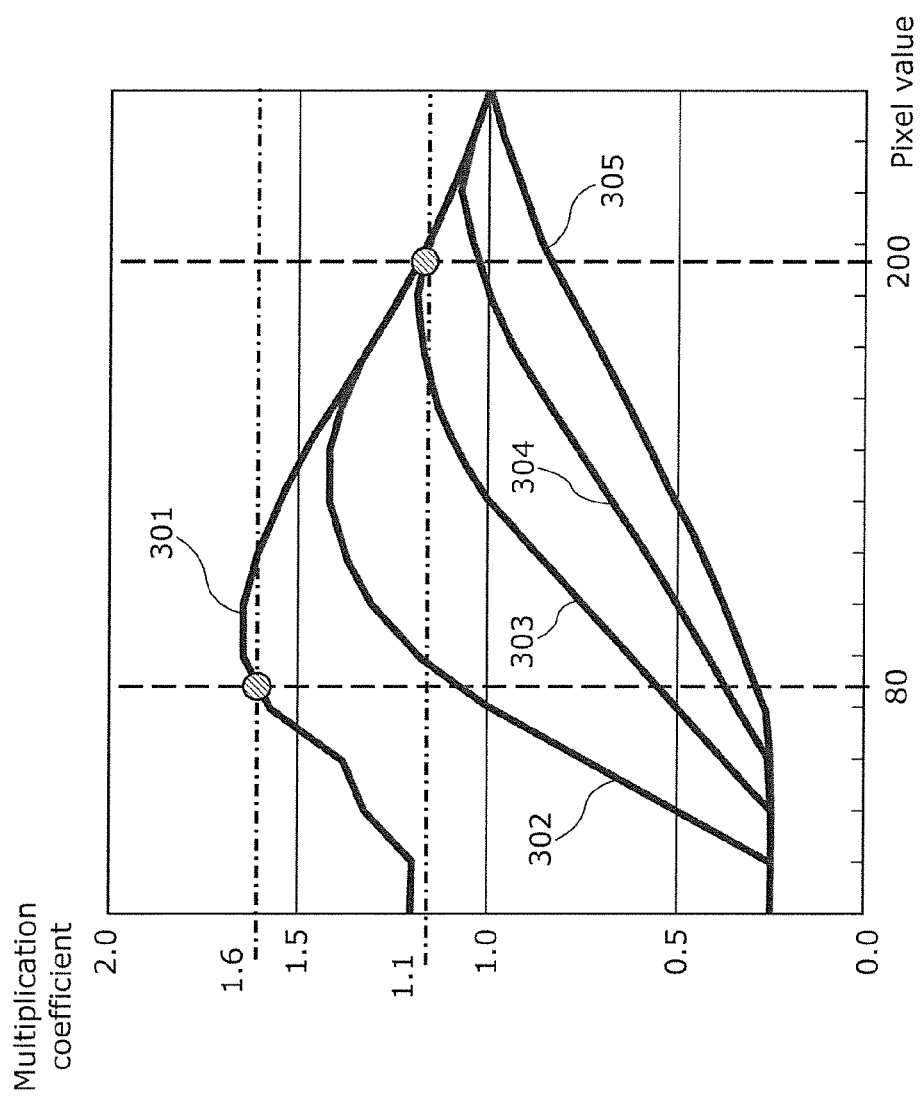
FIG. 7 illustrates examples of limited multiplication coefficients according to Embodiment 1.

Specific examples of a phenomenon in which the brightness is excessively increased are now described with reference to FIGS. 6A, 6B, and 7. FIG. 6A shows pixel values of an original image. A middle area having slightly bright pixel value (80) is in a large area having a dark pixel value (0), and furthermore, a small area having a quite bright pixel value (200) is in the middle area. In this case, in a reduced image, reduction processing allows the information on the large area and the middle area to remain, but causes the small area to disappear in the middle area, as illustrated in FIG. 6B.

For this reduced image, the multiplication coefficient generation unit 103 calculates a multiplication coefficient based on the two-dimensional LUT, using a blur signal value indicating 0 and a pixel value indicating 80. As a result, as shown in FIG. 7, 1.6 is calculated as a multiplication coefficient. A pixel value obtained by multiplying the pixel value (200) of the small area of the original image by 1.6 is 320 which greatly exceeds 255 that is the maximum value of a pixel value, thus making the small area excessively bright.

On the other hand, in the present embodiment, 1.6 is calculated as a multiplication coefficient for the reduced image, and the enlargement unit 104 performs enlargement processing on the multiplication coefficient. Thereafter, the limitation unit 105 limits enlarged multiplication coefficients based on the upper limit. Specifically, for example, the limitation unit 105 limits a multiplication coefficient based on the upper limit indicating 1.1 specified using the one-dimensional characteristics table corresponding to a blur signal value indicating 0 for a pixel value of 200. As a result, the corrected pixel value is 220. Accordingly, the image processing device 100 can prevent the small area which has disappeared in the reduced image due to reduction from becoming excessively bright in the original image.

Figure 9:
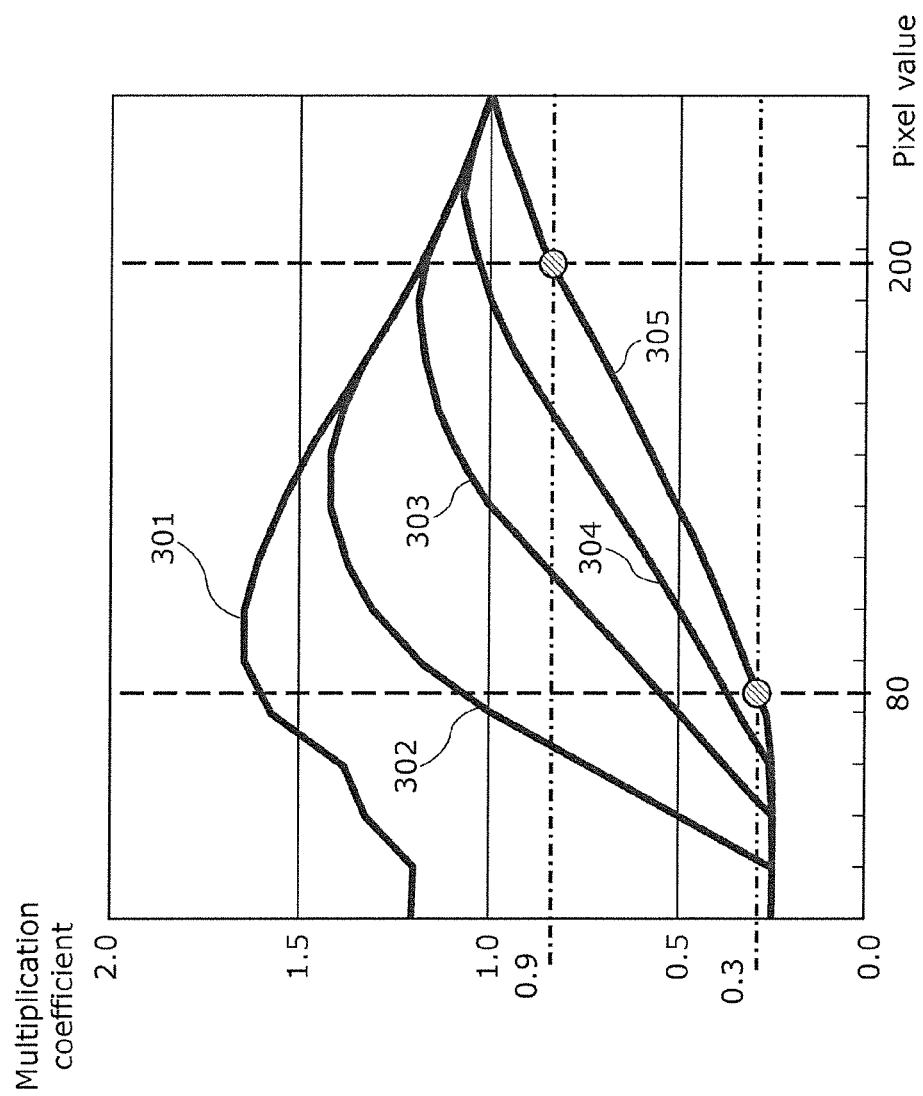
FIG. 9 illustrates examples of limited multiplication coefficients according to Embodiment 1.

The following describes specific examples of a phenomenon in which the brightness is excessively decreased, with reference to FIGS. 8A, 8B, and 9. FIG. 8A shows pixel values of an original image. A middle area having a rather dark pixel value (80) is in a large area having the brightest pixel value (255), and furthermore a small area having a bright pixel value (200) in the middle area. In this case, in a reduced image, reduction processing allows the information on the large area and the middle area to remain, but causes the small area to disappear in the middle area, as illustrated in FIG. 8B.

For this reduced image, the multiplication coefficient generation unit 103 calculates a multiplication coefficient based on the two-dimensional LUT, using a blur signal value indicating 255 and a pixel value indicating 80. As a result, 0.3 is calculated as a multiplication coefficient, as shown in FIG. 9. However, the pixel value obtained by multiplying the pixel value (200) of the small area of the original image by 0.3 is 60, which excessively decreases the brightness of the small area of the original image.

On the other hand, in the present embodiment, 0.3 is calculated as a multiplication coefficient for a reduced image, and the enlargement unit 104 performs enlargement processing on the multiplication coefficient. Thereafter, the limitation unit 105 limits enlarged multiplication coefficients based on the lower limit. Specifically, for example, the multiplication coefficient is limited based on the lower limit indicating 0.9 specified using the one-dimensional characteristics table according to a blur signal value indicating 255 for a pixel value indicating 200. As a result, the corrected pixel value is 180. Accordingly, the image processing device 100 can prevent the small area which has disappeared in the reduced image due to reduction from becoming excessively dark in the original image.

Thus, the image processing device 100 can achieve both reduction in the amount of processing of generating coefficients for correcting an original image, and inhibition of deterioration in image quality which occurs due to the reduction in the amount of processing.

Embodiment 2

Figure 10:
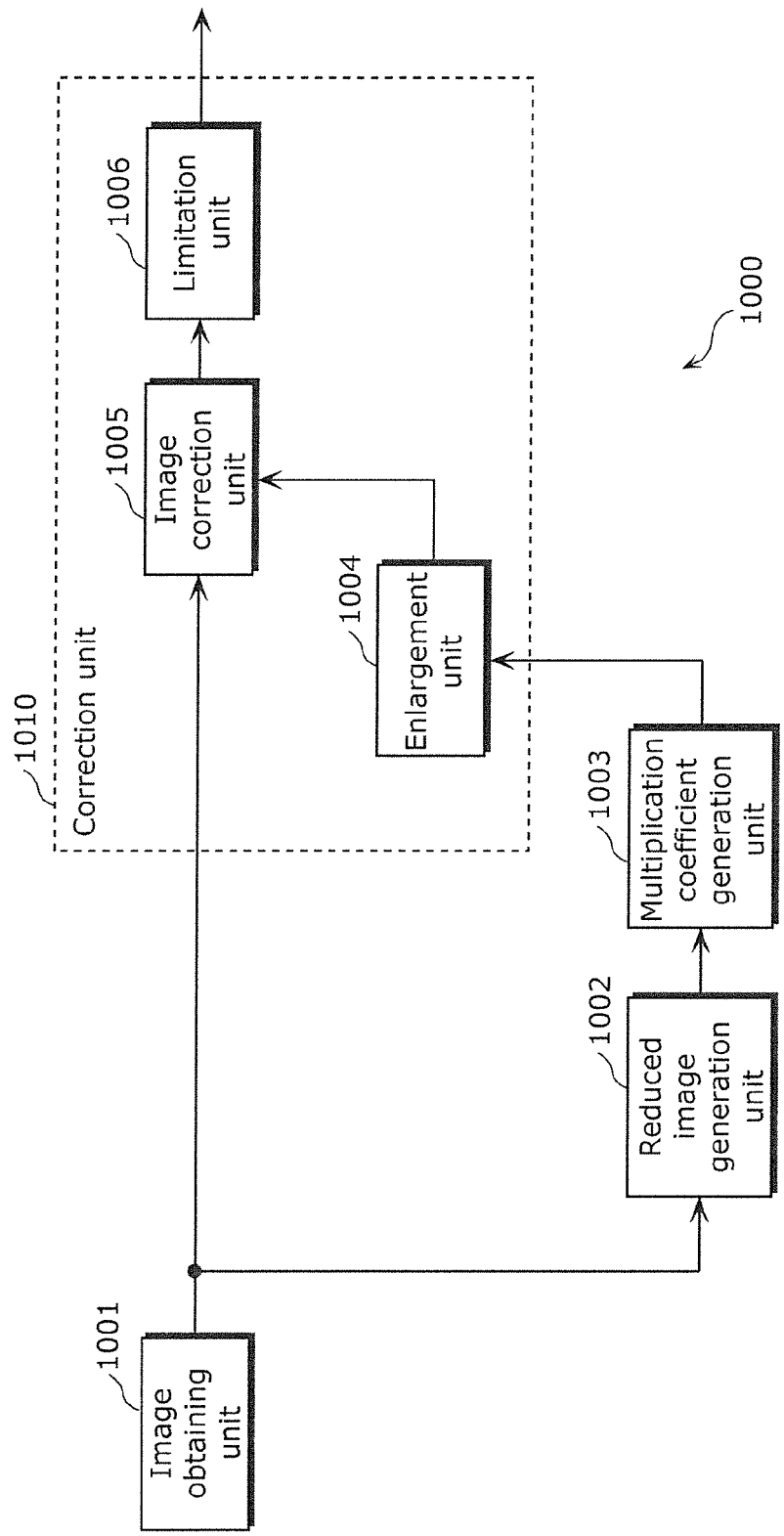
FIG. 10 is a configuration diagram illustrating a specific example of an image processing device according to Embodiment 2.
Figure 11:
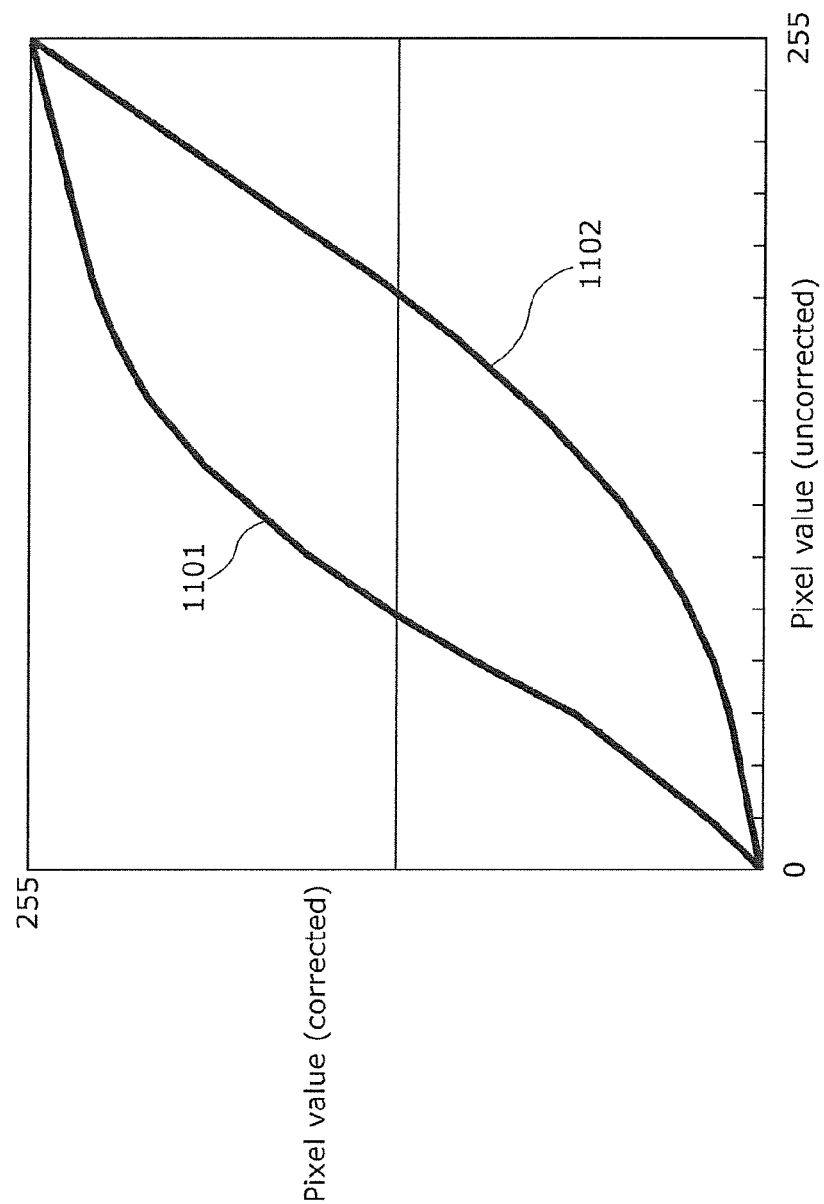
FIG. 11 illustrates an example of a limit range according to Embodiment 2.

The following describes the present embodiment, with reference to FIGS. 10 and 11.
[2-1. Configuration]
FIG. 10 is a schematic diagram illustrating a configuration of an image processing device 1000 according to the present embodiment.

The image processing device 1000 according to the present embodiment includes an image obtaining unit 1001, a reduced image generation unit 1002, a multiplication coefficient generation unit 1003, an enlargement unit 1004, an image correction unit 1005, and a limitation unit 1006. The enlargement unit 1004, the image correction unit 1005, and the limitation unit 1006 form a correction unit 1010.

The image obtaining unit 1001, the reduced image generation unit 1002, the multiplication coefficient generation unit 1003, the enlargement unit 1004, and the image correction unit 1005 according to the present embodiment are constituent elements equivalent to the image obtaining unit 101, the reduced image generation unit 102, the multiplication coefficient generation unit 103, the enlargement unit 104, and the image correction unit 106 according to Embodiment 1, respectively, and thus a description thereof is omitted.

The limitation unit 1006 limits pixel values of pixels included in an original image corrected by the image correction unit 1005 on a pixel-by-pixel basis, based on an upper limit, a lower limit, or both according to uncorrected pixel values of the original image.

The following describes a specific operation of the limitation unit 1006, with reference to the drawings.

The limitation unit 1006 calculates a range for a corrected pixel value according to an uncorrected pixel value of a current pixel to be processed in the original image, and limits the corrected pixel value to the calculated range. Specifically, the limitation unit 1006 calculates a range for a corrected pixel value, based on a one-dimensional characteristics table generated from a two-dimensional LUT used by the multiplication coefficient generation unit 1003. More specifically, the limitation unit 1006 generates a one-dimensional characteristics table obtained by projecting the two-dimensional LUT onto one-dimension and thereafter multiplying a pixel value of a current pixel to be processed.

For example, an upper limit one-dimensional characteristics table includes pixel values obtained by multiplying, for each of pixel values of 0 to 255 each representing a pixel value of a current pixel to be processed by a greatest one of multiplication coefficients corresponding to blur signal values of 0 to 255. Similarly, a lower limit one-dimensional characteristics table includes pixel values obtained by multiplying, for each of pixel values of 0 to 255 each representing a pixel value of a current pixel to be processed by a smallest one of multiplication coefficients corresponding to blur signal values of 0 to 255.

FIG. 11 illustrates an example of a limit range based on an upper limit one-dimensional characteristics table and a lower limit one-dimensional characteristics table.

A one-dimensional characteristics table 1101 shown in FIG. 11 is an upper limit one-dimensional characteristics table. The one-dimensional characteristics table 1101 includes pixel values obtained by multiplying each of pixel values of 0 to 255 each representing a pixel value of a current pixel to be processed by a greatest one of multiplication coefficients corresponding to blur signal values of 0 to 255.

A one-dimensional characteristics table 1102 shown in FIG. 11 is a lower limit one-dimensional characteristics table. The one-dimensional characteristics table 1102 includes pixel values obtained by multiplying each of pixel values of 0 to 255 each representing a pixel value of a current pixel to be processed by a smallest one of multiplication coefficients corresponding to blur signal values of 0 to 255.

If a corrected pixel value of a current pixel to be processed is greater than an upper limit obtained from an uncorrected pixel value of the current pixel, the limitation unit 1006 replaces the corrected pixel value with the upper limit. In addition, if a corrected pixel value of a current pixel to be processed is smaller than the lower limit obtained from an uncorrected pixel value of the current pixel, the limitation unit 1006 replaces the corrected pixel value with the lower limit.

[2-2. Supplementary Description]

In the present embodiment, the image processing device 1000 obtains an original image, reduces the obtained original image, and generates a reduced image, as described above. Here, the reduced image is an image having a resolution lower than the original image. In addition, the image processing device 1000 calculates a multiplication coefficient for each pixel included in the reduced image, based on characteristic information of a multiplication coefficient by which a pixel value of a current pixel to be processed is multiplied. It should be noted that characteristic information specifies a multiplication coefficient, in accordance with a pixel value of a current pixel to be processed and a brightness state related to brightness of a portion surrounding the current pixel.

The image processing device 1000 enlarges multiplication coefficients calculated for pixels included in the reduced image, to calculate multiplication coefficients corresponding to pixels included in an original image. The image processing device 1000 multiplies, for each pixel of the original image, a pixel value of the pixel by a multiplication coefficient corresponding to the pixel, to correct the original image.

Here, the image processing device 1000 limits pixel values obtained by multiplying pixel values of pixels of the original image by multiplication coefficients corresponding to the pixels of the original image to a range calculated based on the pixel values and characteristic information of the pixels of the original image. In other words, the image processing device 1000 changes the pixel values obtained by multiplication, within the range calculated based on the original pixel values and characteristic information, and outputs the resultant pixel values.

[2-3. Advantageous Effects and Others]

In an area where a design has disappeared due to reduction, multiplication coefficients obtained by enlarging the multiplication coefficients calculated for a reduced image may be greatly different from multiplication coefficients obtained by two-dimensional LUT processing on an original image, without reducing the original image. This may excessively increase or decrease the brightness of a small bright area in a dark area more than intended.

This phenomenon is caused by the following: multiplication coefficients corresponding to pixels of the reduced image of the original image are calculated using the reduced image; and the multiplication coefficients corresponding to the pixels of the reduced image are enlarged to the multiplication coefficients corresponding to pixels of the original image. More specifically, this phenomenon is caused by the disappearance of a design due to reduction.

To address this, the image processing device 1000 according to the present embodiment limits corrected pixel values to a range according to uncorrected pixel values and characteristic information used for calculating multiplication coefficients. In this manner, the image processing device 1000 can set pixel values to be finally output to an appropriate range according to characteristic information. The image processing device 1000 can prevent a phenomenon in which an area where a design has disappeared due to reduction has excessively high or low brightness.

Thus, the image processing device 1000 can achieve both reduction in the amount of processing for generating coefficients for correcting an original image, and inhibition of deterioration in image quality which occurs due to the reduction in the amount of processing.

Conclusion

As described above, the image processing device (the image processing device 100, 1000) according to the present disclosure corrects, on a pixel-by-pixel basis, brightness of an original image which includes pixels having pixel values each related to brightness. Specifically, for example, the image processing device corrects a dark portion or a bright portion. The image processing device includes a generation unit (the multiplication coefficient generation unit 103, 1003) and a correction unit (the correction unit 110, 1010).

The generation unit generates coefficients corresponding to pixels of a reduced image of an original image using a predetermined relation. Here, the predetermined relation is a relation predetermined for a pixel value of a current pixel to be processed, a brightness state related to brightness of a portion surrounding the current pixel, and a coefficient for correcting the pixel value of the current pixel.

The correction unit generates coefficients corresponding to pixels of the original image from coefficients corresponding to pixels of the reduced image. At that time, the correction unit performs, on the coefficients corresponding to the pixels of the reduced image one or more times, expansion processing of expanding coefficients from coefficients corresponding to pixels of a first image to coefficients corresponding to pixels of a second image larger than the first image. The correction unit corrects pixel values of pixels of the original image using coefficients corresponding to the pixels of the original image.

The correction unit limits, to a limit range according to the predetermined relation, at least one of (i) a coefficient corresponding to one of the pixels of the second image in at least one of the one or more times the correction unit performs the expansion processing or (ii) one of the corrected pixel values of the pixels of the original image. In other words, the correction unit limits a coefficient corresponding to one of the pixels of the second image and/or one of the corrected pixel values of the pixels of the original image so that the coefficient corresponding to the pixel of the second image and/or the corrected pixel value of the pixel of the original image are in the limit range.

In this manner, the image processing device can achieve both reduction in the amount of processing of generating coefficients for correcting the original image and inhibition of deterioration in image quality caused by the reduction in the amount of processing.

For example, the limit range may be a range for a coefficient obtained using a pixel value of the pixel of the second image as the pixel value of the current pixel, in accordance with the predetermined relation. The correction unit may limit a coefficient corresponding to a pixel of the second image to such a limit range in at least one time expansion processing is performed.

The limit range in such a case may have, for each of pixel values each representing the pixel value of the current pixel, an upper limit which is a greatest one of coefficients obtained according to brightness states, in accordance with the pixel value, the brightness states, and the predetermined relation. The limit range in such a case may have, for each of pixel values each representing the pixel value of the current pixel, a lower limit which is a smallest one of coefficients obtained according to brightness states, in accordance with the pixel value, the brightness states, and the predetermined relation.

For example, the limit range may be a range in which the corrected pixel value of a pixel of the pixels of the original image is obtained by correcting the pixel value of the pixel of the original image using one of coefficients in a range for a coefficient obtained using the pixel value of the pixel of the original image as the pixel value of the current pixel in accordance with the predetermined relation. The correction unit may limit the corrected pixel value of the pixel of the original image to such a limit range.

The limit range in this case may have, for each of pixel values each representing the pixel value of the current pixel, an upper limit which is a corrected pixel value obtained by correcting the pixel value using a greatest one of coefficients obtained according to brightness states, in accordance with the predetermined relation. The limit range in this case may have, for each of pixel values each representing the pixel value of the current pixel, a lower limit which is a corrected pixel value obtained by correcting the pixel value using a smallest one of coefficients obtained according to brightness states, in accordance with the predetermined relation.

For example, the limit range may have only the upper limit out of the upper limit and the lower limit. In other words, only the upper limit may be specified out of the upper limit and the lower limit. Subjective deterioration in image quality resulting from an excessively large multiplication coefficient or pixel value is more noticeable than subjective deterioration in image quality resulting from an excessively small multiplication coefficient or pixel value. Thus, the image processing device can appropriately inhibit subjective deterioration in image quality by limiting multiplication coefficients or pixel values based on an appropriate upper limit.

Figure 12:
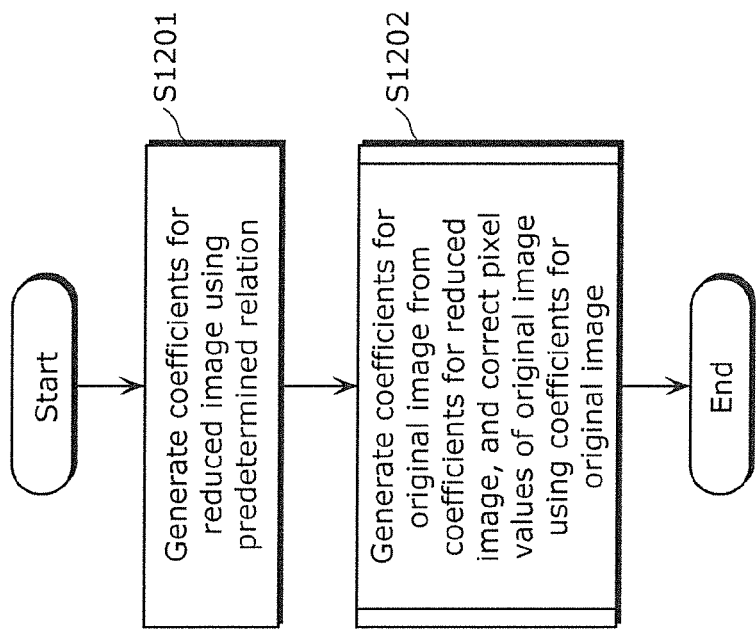
FIG. 12 is a flowchart showing operation of the image processing device according to Embodiment 1 or 2.

FIG. 12 is a flowchart showing main operation of the image processing device according to the present disclosure. First, the generation unit generates coefficients for a reduced image using a predetermined relation (S1201). Next, the correction unit generates coefficients for an original image from the coefficients for the reduced image, and corrects pixel values of the original image using the coefficients for the original image (S1202).

Figure 13:
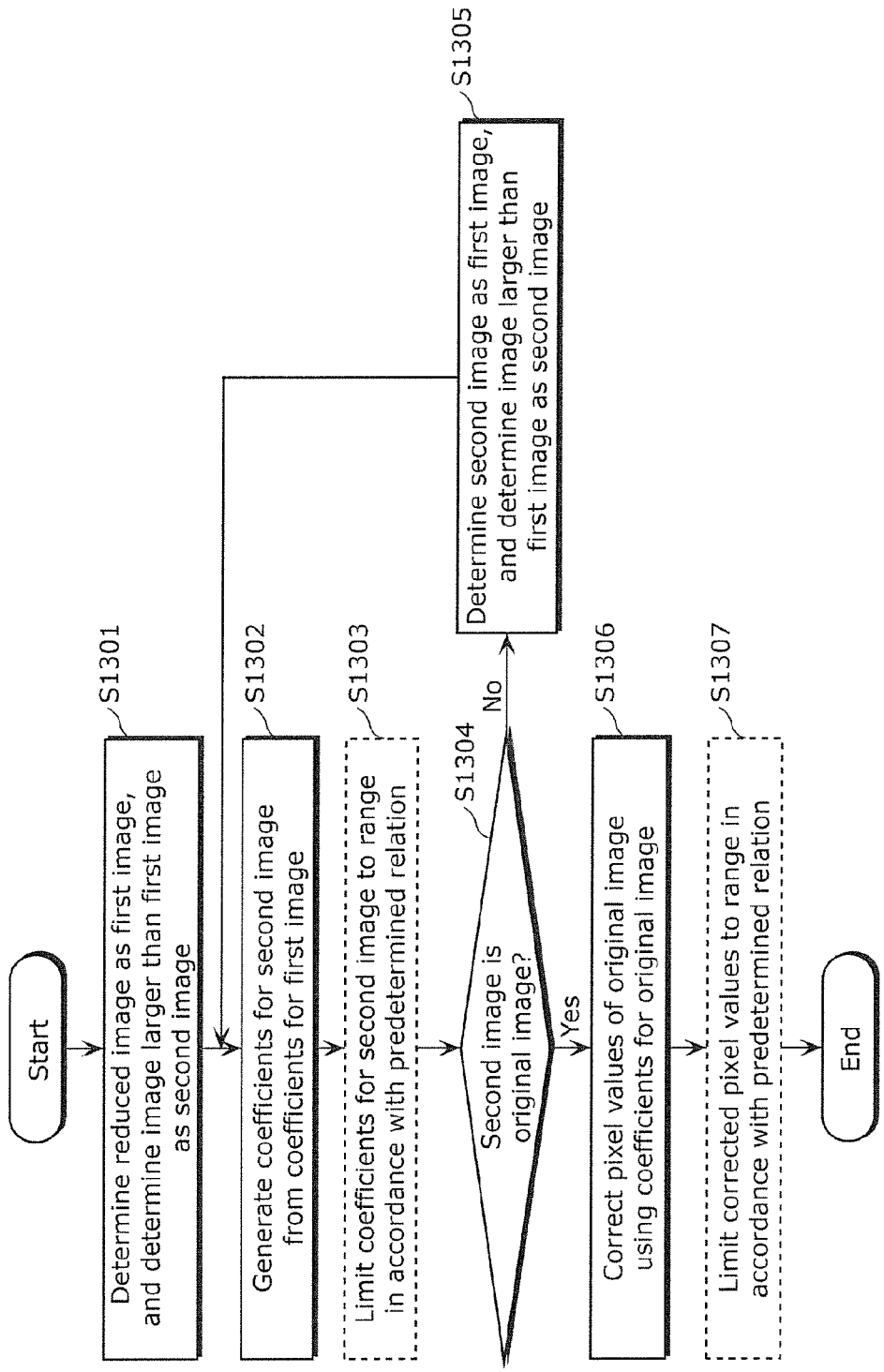
FIG. 13 is a flowchart showing operation of a correction unit according to Embodiment 1 or 2.

FIG. 13 is a flowchart showing specific operation for correction processing (S1202) shown in FIG. 12. First, the correction unit determines the reduced image as a first image, and determines an image larger than the first image as a second image (S1301). Next, the correction unit generates coefficients for the second image from coefficients for the first image (S1302). Next, the correction unit limits the coefficients for the second image to a range in accordance with the predetermined relation (S1303).

If the image determined as the second image is not the original image (No in S1304), the correction unit determines the image determined as the second image as the first image, and determines an image larger than the first image as the second image (S1305). Then, the correction unit repeats processing again from the processing of generating coefficients for the second image from the coefficients for the first image (S1302).

On the other hand, if the image determined as the second image is the original image (Yes in S1304), the correction unit corrects the pixel values of the original image using the coefficients for the original image (S1306). Next, the correction unit limits the corrected pixel values to the range in accordance with the predetermined relation (S1307).

It should be noted that limitation processing (S1303, S1307) may not be performed every time. Limitation processing may be performed once in the entire operation. Even if limitation processing is performed only once, deterioration in image quality is inhibited compared to the case where limitation processing is not performed.

The image processing device may selectively include a plurality of constituent elements according to the present disclosure, and the image processing method may selectively include a plurality of processes according to the present disclosure.

Furthermore, the constituent elements according to the present disclosure may be circuits. These circuits may form one circuit as a whole, or separate circuits. These circuits may be general-purpose circuits or dedicated circuits.

A computer may execute the processes according to the present disclosure. For example, a computer executes a program using hardware resources such as a processor (CPU), a memory, and an input output circuit, thus executing the processes according to the present disclosure. Specifically, a processor obtains data to be processed, from a memory or an input output circuit and calculates the data or outputs the calculation result to a memory or an input output circuit, to execute the processes.

A program for executing the processes according to the present disclosure may be stored in a non-transitory computer-readable recording medium such as a CD-ROM. In this case, the computer reads the program from the non-transitory recording medium and executes the program, to execute the processes.

The image processing device according to the present disclosure may be expressed as a spatial vision processing device. The image processing method according to the present disclosure may be expressed as a spatial vision processing method.

The above is a description of embodiments as examples of the technique according to the present disclosure. For this purpose, the accompanying drawings and detailed description are provided.

Therefore, the constituent elements illustrated in the accompanying drawings and described in the detailed description may include not only a constituent element necessary for addressing the problem, but a constituent element not essential for addressing the problem, in order to exemplify the above technique. Accordingly, because of a mere fact that such a non-essential constituent element is illustrated in the accompanying drawings and described in the detailed description, the non-essential constituent element should not be immediately determined to be required.

The embodiments described above are intended to exemplify the technique according to the present disclosure, and thus various changes, replacement, addition, and omission, for instance, can be made within the scope of claims and its equivalent.

INDUSTRIAL APPLICABILITY

The present disclosure is applicable to an image processing method for correcting the brightness of an original image on a pixel-by-pixel basis. Specifically, the present disclosure is applicable to image processing devices such as a liquid crystal display, a BD player, and a network player.

The invention claimed is:

1. An image processing method for correcting, on a pixel-by-pixel basis, brightness of an original image which includes pixels having pixel values each related to brightness, the image processing method comprising:
   (a) generating coefficients corresponding to pixels of a reduced image of the original image, using a predetermined relation for a pixel value of a current pixel to be processed, a brightness state related to brightness of a portion surrounding the current pixel, and a coefficient for correcting the pixel value of the current pixel; and (b) generating coefficients corresponding to the pixels of the original image from the coefficients corresponding to the pixels of the reduced image, to expand the coefficients corresponding to the pixels of the reduced image to the coefficients corresponding to the pixels of the original image, and correcting the pixel values of the pixels of the original image using the coefficients corresponding to the pixels of the original image, wherein in step (b), the coefficients corresponding to the pixels of the reduced image are expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and step (b) further includes limiting, to a limit range according to the predetermined relation, at least one of (i) a coefficient corresponding to a pixel of the pixels of the second image in at least one of the one or more times the expansion processing is performed or (ii) a corrected pixel value of the corrected pixel values of the pixels of the original image.

2. The image processing method according to claim 1, wherein in step (b), the limit range is a range for a coefficient obtained using a pixel value of the pixel of the second image as the pixel value of the current pixel, in accordance with the predetermined relation, and the coefficient corresponding to the pixel of the second image is limited to the limit range.

3. The image processing method according to claim 1, wherein in step (b), the limit range is a range in which the corrected pixel value is obtained by correcting a pixel value of a pixel of the pixels of the original image using one of coefficients in a range for a coefficient obtained using the pixel value of the pixel of the original image as the pixel value of the current pixel in accordance with the predetermined relation, and the corrected pixel value of the pixel of the original image is limited to the limit range.

4. The image processing method according to claim 2, wherein the limit range has, for each of pixel values each representing the pixel value of the current pixel, an upper limit which is a greatest one of coefficients obtained according to brightness states each representing the brightness state, in accordance with the pixel value, the brightness states, and the predetermined relation.

5. The image processing method according to claim 2, wherein the limit range has, for each of pixel values each representing the pixel value of the current pixel, a lower limit which is a smallest one of coefficients obtained according to brightness states each representing the brightness state, in accordance with the pixel value, the brightness states, and the predetermined relation.

6. The image processing method according to claim 3, wherein the limit range has, for each of pixel values each representing the pixel value of the current pixel, an upper limit which is a corrected pixel value obtained by correcting the pixel value using a greatest one of coefficients obtained according to brightness states each representing the brightness state, in accordance with the pixel value, the brightness states, and the predetermined relation.

7. The image processing method according to claim 3, wherein the limit range has, for each of pixel values each representing the pixel value of the current pixel, a lower limit which is a corrected pixel value obtained by correcting the pixel value using a smallest one of coefficients obtained according to brightness states each representing the brightness state, in accordance with the pixel value, the brightness states, and the predetermined relation.

8. An image processing device for correcting, on a pixel-by-pixel basis, brightness of an original image which includes pixels having pixel values each related to brightness, the image processing device comprising:

a generation unit configured to generate coefficients corresponding to pixels of a reduced image of the original image, using a predetermined relation for a pixel value of a current pixel to be processed, a brightness state related to brightness of a portion surrounding the current pixel, and a coefficient for correcting the pixel value of the current pixel; and a correction unit configured to generate coefficients corresponding to the pixels of the original image from the coefficients corresponding to the pixels of the reduced image, to expand the coefficients corresponding to the pixels of the reduced image to the coefficients corresponding to the pixels of the original image, and correct the pixel values of the pixels of the original image using the coefficients corresponding to the pixels of the original image, wherein the correction unit is configured to expand the coefficients corresponding to the pixels of the reduced image to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and the correction unit is further configured to limit, to a limit range according to the predetermined relation, at least one of (i) a coefficient corresponding to one of the pixels of the second image in at least one of the one or more times the correction unit performs the expansion processing or (ii) one of the corrected pixel values of the pixels of the original image.

* * * * *